United States Patent
Youn et al.

(10) Patent No.: US 7,751,570 B2
(45) Date of Patent: Jul. 6, 2010

(54) METHOD AND APPARATUS FOR MANAGING CRYPTOGRAPHIC KEYS

(75) Inventors: Paul Youn, Redwood City, CA (US); Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1128 days.

(21) Appl. No.: 11/398,187

(22) Filed: Apr. 4, 2006

(65) Prior Publication Data

US 2007/0230704 A1    Oct. 4, 2007

(51) Int. Cl.
*H04L 9/08* (2006.01)
*H04L 9/00* (2006.01)
*H04L 9/32* (2006.01)

(52) U.S. Cl. .................. 380/278; 380/286; 380/45; 713/168

(58) Field of Classification Search .................. 707/201
See application file for complete search history.

(56) References Cited

U.S. PATENT DOCUMENTS

| | | | | |
|---|---|---|---|---|
| 5,924,094 A * | 7/1999 | Sutter | ......................... | 707/10 |
| 6,336,121 B1 * | 1/2002 | Lyson et al. | ................ | 707/201 |
| 6,760,843 B1 * | 7/2004 | Carter | ......................... | 726/10 |
| 6,845,450 B1 * | 1/2005 | Kobayashi et al. | ............ | 726/5 |
| 7,493,499 B1 * | 2/2009 | Deaver et al. | ............... | 713/193 |
| 2004/0146164 A1 * | 7/2004 | Jonas et al. | ................ | 380/284 |

* cited by examiner

*Primary Examiner*—Emmanuel L Moise
*Assistant Examiner*—Phy Anh Vu
(74) *Attorney, Agent, or Firm*—Park, Vaughan & Fleming LLP (57) ABSTRACT

One embodiment of the present invention provides a system for managing keys. During operation, the system receives a request from a user at a database to encrypt/decrypt data at the database. In response to this request, the system sends a user-token to the user, wherein the user-token includes a user-key encrypted with a user-secret thereby enabling the user to decrypt the user-key with the user-secret. Next, the system receives the decrypted user-key from the user. The system then uses the user-key to encrypt/decrypt the data at the database. Finally, the system deletes the user-key at the database.

23 Claims, 5 Drawing Sheets

METHOD AND APPARATUS FOR MANAGING CRYPTOGRAPHIC KEYS

BACKGROUND

1. Field of the Invention

The present invention relates to computer security. More specifically, the present invention relates to a method and apparatus for managing cryptographic keys in a computing environment.

2. Related Art

In an effort to protect information from getting into the wrong hands, users often employ cryptographic techniques when storing and/or transmitting confidential information. For example, common cryptographic techniques typically involve using a decryption key to decrypt information that a client or server has encrypted with a corresponding encryption key. Note that in some instances the decryption key and the encryption key can be the same key. By using these cryptographic techniques, the problem of protecting information transforms into the problem of protecting cryptographic keys.

Each server or database that uses cryptographic techniques typically employs some type of strategy or mechanism to protect the corresponding cryptographic keys from unwanted distribution. However, these strategies or mechanisms usually provide little protection from a malicious administrator who wishes to obtain the corresponding cryptographic keys particularly because storage encryption keys may often be stored persistently on the server.

Shifting the responsibility of protecting cryptographic keys from the server or the database to the owners of the data that is being protected helps protect the cryptographic keys from malicious administrators. However, for each cryptographic key that a user protects, there is an increase in the user's infrastructure required to securely store the cryptographic key. Furthermore, there can be a corresponding increase in the user's infrastructure required to handle key recovery in the event that the cryptographic key is lost. This increase in infrastructure can be both costly and difficult to maintain.

Hence, what is needed is a method for managing cryptographic keys without the problems listed above.

SUMMARY

One embodiment of the present invention provides a system for managing keys. During operation, the system receives a request from a user at a database to encrypt/decrypt data at the database. In response to this request, the system sends a user-token to the user, wherein the user-token includes a user-key encrypted with a user-secret thereby enabling the user to decrypt the user-key with the user-secret. Next, the system receives the decrypted user-key from the user. The system then uses the user-key to encrypt/decrypt the data at the database. Finally, the system deletes the user-key at the database.

In a variation on this embodiment, using the user-key to encrypt/decrypt the data involves directly encrypting/decrypting the data with the user-key.

In a variation on this embodiment, the client performs the actual encryption and decryption of the data that is stored on the database. During a request, the data is sent from the database to the client, the client performs encryption and/or decryption, and optionally sends the database the newly encrypted or decrypted information.

In a variation on this embodiment, using the user-key to encrypt/decrypt the data involves decrypting an encrypted "data-key" with the user-key, and then using that key to encrypt/decrypt the data.

In a further variation, the system encrypts a second copy of the data key with a second user-key belonging to a second user so that the second user can also access the data.

In a further variation, the system modifies the data-key and encrypts the modified data-key with the user-key belonging to the user. The system also deletes the encrypted second copy of the original data-key. Next, the system creates a new second copy of the data-key to match the modified data-key, and encrypts the new second copy of the data-key with the second user-key.

In a variation on this embodiment, the system encrypts a second copy of the user-key with a second user-key belonging to a second user so that the second user can also access the data or help the first user to recover their user-key.

In a further variation, prior to the system encrypting the user-key with the second user-key, the system encrypts the user-key with a master-key, which is stored in an external security module coupled to the database.

In a variation on this embodiment, the system creates the user-token. This process begins when the system receives a request from the client at the database to create the user-token. The system then generates the user-key. Next, the system sends the user-key to the user. Finally, the system receives the user-token from the user, wherein the user-token includes the user-key encrypted with the user-secret.

In a further variation, generating the user-key involves the client creating the user-key.

In a variation on this embodiment, the user-secret can include a cryptographic key, a password, or a certificate.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention operates by having users maintain their own secrets (such as passwords, cryptographic keys, etc.). In this embodiment, the server also maintains a corresponding secret. The server's version of the secret is persistently stored, but encrypted under the user's own secret. If the user's secret is $U_{SECRET}$ and the server's corresponding secret (or system key) is $S_{KEY}$, then the server stores $\{S_{KEY}\}\_U_{SECRET}$. If the user wishes to authorize the server to use $S_{KEY}$ on behalf of the user (say to decrypt data stored in a database), then the user initiates a request to obtain $\{S_{KEY}\}\_U_{SECRET}$. Next, the user decrypts $\{S_{KEY}\}\_U_{SECRET}$ to obtain $S_{KEY}$, and sends $S_{KEY}$ back to the server.

This embodiment of the present invention has several benefits. For example, a user does not need to trust the system (or its administrators) with the user's secret, $U_{SECRET}$. In this embodiment, the system never learns the value of $U_{SECRET}$. As such, this embodiment of the present invention can integrate seamlessly with any existing secret deployment such as a Public Key Infrastructure (PKI).

A second benefit of the present invention is that the system can store other versions of $S_{KEY}$. This can facilitate easy recovery of forgotten or lost $U_{SECRET}s$. For example, a special "security officer" can be trusted with the ability to reset $S_{KEY}$ for a particular user. If the security officer has a user secret, $SOU_{SECRET}$, and a corresponding system key, $SOS_{KEY}$, then the security officer can help a user, such as user1, maintain the system key, $USER1S_{KEY}$, associated with user1 by storing a backup copy of $USER1S_{KEY}$. Note that user1's system key is stored as $\{USER1S_{KEY}\}\_U_{SECRET}$. In one embodiment of the present invention, the system stores $\{SOS_{KEY}\}\_SOU_{SECRET}$ and $\{USER1S_{KEY}\}\_SOS_{KEY}$. Then, if the need arises (such as if user1 loses $U_{SECRET}$), the security officer can unlock the $SOS_{KEY}$ using $SOU_{SECRET}$, and use the $SOS_{KEY}$ to recover $USER1S_{KEY}$ for user1. User1 can then re-encrypt $USER1S_{KEY}$ with a new user-secret.

In one embodiment of the present invention, the user sends the user's secret to a third-party system. In this embodiment, the third-party system is responsible for maintaining and securing the user's secret.

In one embodiment of the present invention, the system can leverage any existing secret infrastructure, such as a PKI (public key infrastructure), to establish user secrets in a third-party system. This is advantageous because user-secret networks (such as PKI) require a great deal of infrastructure to deal with situations such as lost keys and key recovery. By leveraging an existing framework, the system does not incur the additional overhead of an increased infrastructure.

In one embodiment of the present invention, leveraging an existing framework does not require the user to reveal the user's secret to a new third-party system. This creates defense in depth, or compartmentalization, because the security of the existing user-secret network is never at risk through the new third-party system. This embodiment provides increased flexibility because there is no need to use an existing secret network, and the user can use something as simple as a password as a user-secret. However, because the system does not reveal the user-secret to the third-party system, the user can reuse the user-secret for other systems.

Computing Environment

Figure 1:
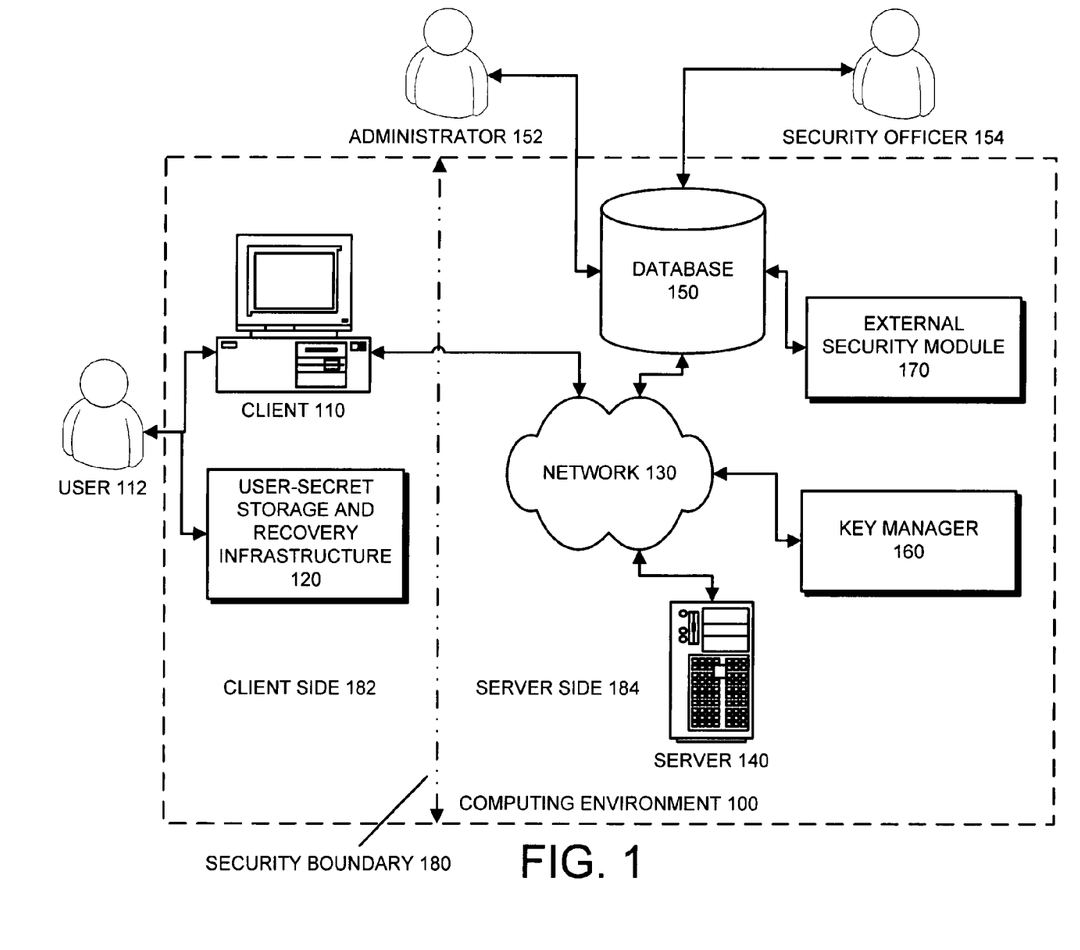
FIG. 1 illustrates a computing environment in accordance with an embodiment of the present invention.

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 110, user-secret storage and recovery infrastructure 120, network 130, server 140, database 150, key manager 160, and external security module 170.

Client 110 can generally include any node on a network including computational capability and including a mechanism for communicating across the network.

User-secret storage and recovery infrastructure 120 can generally include any system implemented by a user for storing a user-secret and for recovering the user-secret in the event that the user-secret is lost.

Network 130 can generally include any type of wired or wireless communication channel capable of coupling together computing nodes. This includes, but is not limited to, a local area network, a wide area network, or a combination of networks. In one embodiment of the present invention, network 130 includes the Internet.

Server 140 can generally include any computational node including a mechanism for servicing requests from a client for computational and/or data storage resources.

Database 150 can generally include any type of system for storing data in non-volatile storage. This includes, but is not limited to, systems based upon magnetic, optical, and magneto-optical storage devices, as well as storage devices based on flash memory and/or battery-backed up memory.

Key manager 160 can generally include any system for managing cryptographic keys. In one embodiment of the present invention, key manager 160 can be included as part of server 140, or as part of database 150.

External security module 170 can generally include any physical or logical device created to be highly resistant to unauthorized access. A physical external security module (ESM) is referred to as a hardware security module (HSM). In a HSM, all sensitive data is stored in a separate physical storage device with its own access control policies. The physical storage device along with its software interfaces are usually certified or tested against both physical and software-based intrusion attempts. Note that security officer 154 can couple external security module 170 to database 150 (as illustrated), key manager 160, or server 140.

In one embodiment of the present invention, security boundary 180 conceptually divides computing environment 100 into client-side 182 and server-side 184.

Note that one embodiment of the present invention can be included as part of server 140 or key manager 160. In another embodiment of the present invention, the present invention can be included as part of database 150.

In one embodiment of the present invention, administrator 152 is responsible for maintaining database 150. User 112 wishes to encrypt data stored in database 150; however, user 112 does not want to compromise the secrecy of user 112's user-secret ($U_{SECRET}$) by transmitting the $U_{SECRET}$ across security boundary 180. Therefore, user 112 requests a user-key (or system key), $S_{KEY}$, from database 150, which user 112 can use to encrypt and decrypt data. User 112 then encrypts the $S_{KEY}$ with the $U_{SECRET}$ to create a user-token, $\{S_{KEY}\}\_U_{SECRET}$, and sends the user-token to database 150 for storage. By giving database 150 the responsibility of storing the user-token, user 112 avoids expanding user-secret storage and recovery infrastructure 120. This can be a substantial benefit for a user who requires many user-keys, and subsequently, many user-tokens.

In one embodiment of the present invention, user 112 requests that database 150 generate a data-key (DK). Database 150 uses the $S_{KEY}$ to encrypt/decrypt the DK, and subsequently, database 150 uses the DK to encrypt/decrypt data.

In one embodiment of the present invention, $S_{KEY}$ is a private/public key asymmetric key pair. In this embodiment, database 150 stores a copy of each user's public key. In this embodiment, database 150 can create multiple copies of the DK, and encrypt each copy of the DK with a different public $S_{KEY}$. The advantage of this embodiment is that the DK can be a symmetric key, which is advantageous because symmetric keys provide faster encryption and decryption of data. Furthermore, user 112 can modify the DK without any other users who use the DK logging into database 150. For example, if user 112 modifies the DK, database 150 will delete all existing copies of the DK, and create new copies of the modified DK, which database 150 then encrypts with the public user-keys belonging to the users who owned the deleted copies of the DK. A user can then use their private user-key to decrypt the modified DK.

In one embodiment of the present invention, the user's secret, $U_{SECRET}$, can be used to directly encrypt data keys DK without the use of a server based $S_{KEY}$.

In one embodiment of the present invention, database 150 can store a copy of each user's public key as part of $U_{SECRET}$ in order to encrypt keys or data on behalf of that user.

In one embodiment of the present invention, a user can "grant" a data-key to a second user by encrypting the data-key with the second user's public user-key.

In one embodiment of the present invention, database 150 encrypts a copy of the $S_{KEY}$ with a user key, $SOU_{SECRET}$, belonging to security officer 154. In this embodiment, if user 112 loses the $U_{SECRET}$, and cannot recover the $U_{SECRET}$ from user-secret storage and recovery infrastructure 120, user 112 can request the $S_{KEY}$ from security officer 154. Then, user 112 can encrypt $S_{KEY}$ with a new user-secret.

In one embodiment of the present invention, security officer 154 does not have access to database 150. In this embodiment, a malicious user would need to corrupt both security officer 154 and administrator 152 to obtain and use a user-secret.

In one embodiment of the present invention, database 150 encrypts the $S_{KEY}$ with a master-key before encrypting the $S_{KEY}$ with the $SOU_{SECRET}$. Note that database 150 stores the master-key in external security module 170. This embodiment prevents security officer 154 from obtaining the $S_{KEY}$.

In one embodiment of the present invention, database 150 encrypts the $S_{KEY}$ with a master-key before sending the $S_{KEY}$ to user 112 to encrypt with the $U_{SECRET}$. In this embodiment, the $S_{KEY}$ never crosses security boundary 180 in an unencrypted form. This is beneficial if network 130 is not secure.

Encrypting/Decrypting Data

Figure 2A:
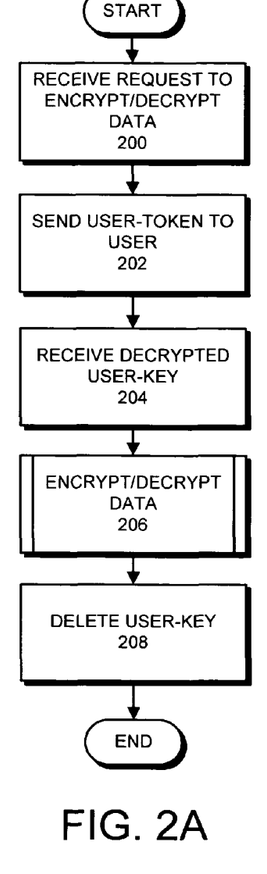
FIG. 2A presents a flowchart illustrating the process of encrypting/decrypting data in accordance with an embodiment of the present invention.

FIG. 2 presents a flowchart illustrating the process of encrypting/decrypting data in accordance with an embodiment of the present invention. The process begins when database 150 receives a request to encrypt/decrypt data from user 112 (step 200). Database 150 then sends the user-token, $\{S_{KEY}\}\_U_{SECRET}$, to user 112 enabling user 112 to decrypt the user-token (step 202). Next, database 150 receives the decrypted user-key, $S_{KEY}$, from user 112 (step 204). Note that $S_{KEY}$ can be part of an asymmetric or a symmetric key pair. After receiving $S_{KEY}$, database 150 uses $S_{KEY}$ to facilitate encrypting/decrypting the data (step 206).

Figure 2B:
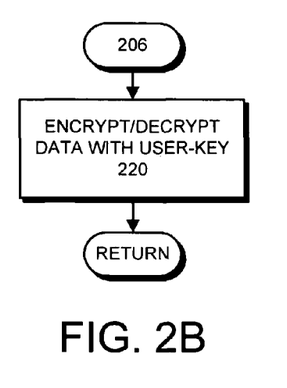
FIG. 2B presents a flowchart illustrating the process of encrypting/decrypting data with a user-key in accordance with an embodiment of the present invention.

In one embodiment of the present invention, encrypting/decrypting the data involves database 150 encrypting/decrypting the data with $S_{KEY}$ as illustrated in FIG. 2B (step 220).

Figure 2C:
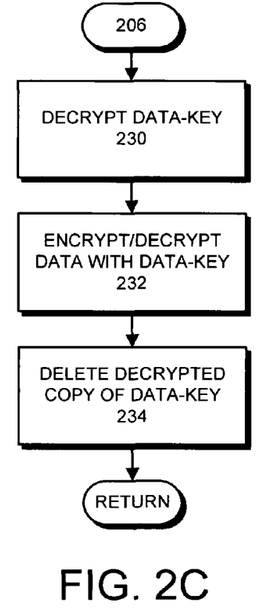
FIG. 2C presents a flowchart illustrating the process of encrypting/decrypting data with a data-key in accordance with an embodiment of the present invention.

In one embodiment of the present invention, encrypting/decrypting the data involves database 150 decrypting a data-key, DK, with $S_{KEY}$ as illustrated in FIG. 2C (step 230). In this embodiment, $S_{KEY}$ can be part of an asymmetric key pair. Next, database 150 encrypts/decrypts the data with the DK (step 232). Database 150 then deletes the decrypted copy of the DK (step 234).

Referring back to FIG. 2A, the process completes when database 150 deletes $S_{KEY}$ (step 208).

Modifying a Data-Key

Figure 3:
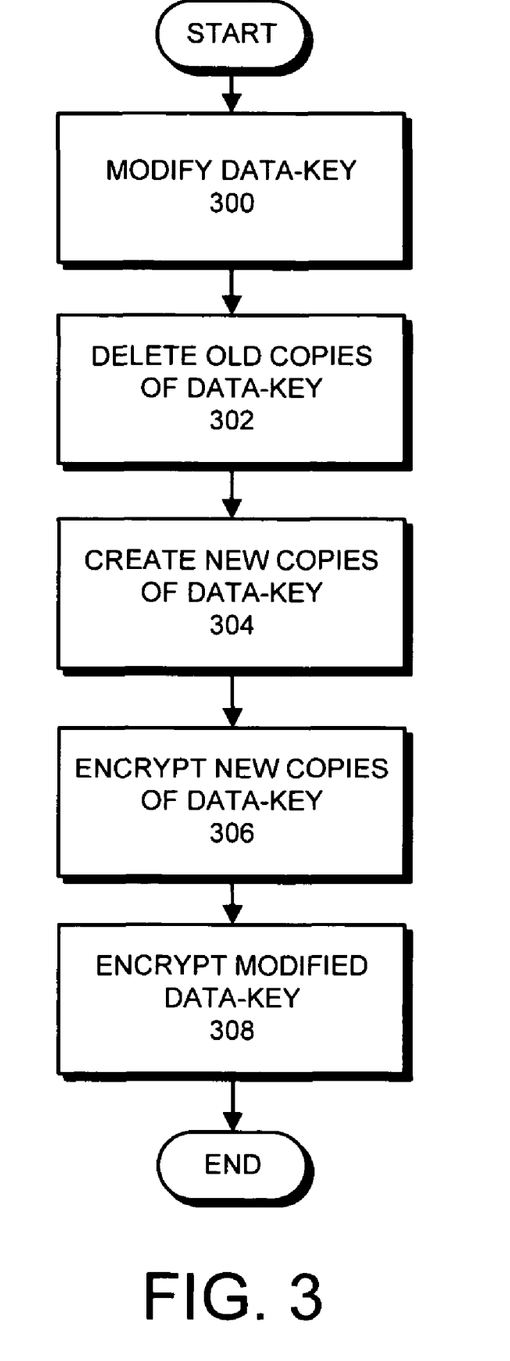
FIG. 3 presents a flowchart illustrating the process of modifying a data-key in accordance with an embodiment of the present invention.

FIG. 3 presents a flowchart illustrating the process of modifying a data-key in accordance with an embodiment of the present invention. The process begins when user 112 modifies the data-key, DK, to create a new data-key, NDK (step 300). Next, database 150 deletes all existing copies of the DK (step 302). Note that deleting all existing copies of the DK includes deleting encrypted copies of the DK. Database 150 then creates copies of the NDK to replace the deleted copies of the DK (step 304). Next, database 150 encrypts the copies of the NDK with the public user-keys belonging to the users whose public user-keys were used to encrypt the copies of the DK (step 306). Note that the public user-key is one-half of a public/private key pair. Using public/private key pairs enables database 150 to encrypt data-keys while still maintaining security boundary 180. The process completes when database 150 encrypts the NDK with user 112's public user-key (step 308).

Creating a User-Token

Figure 4:
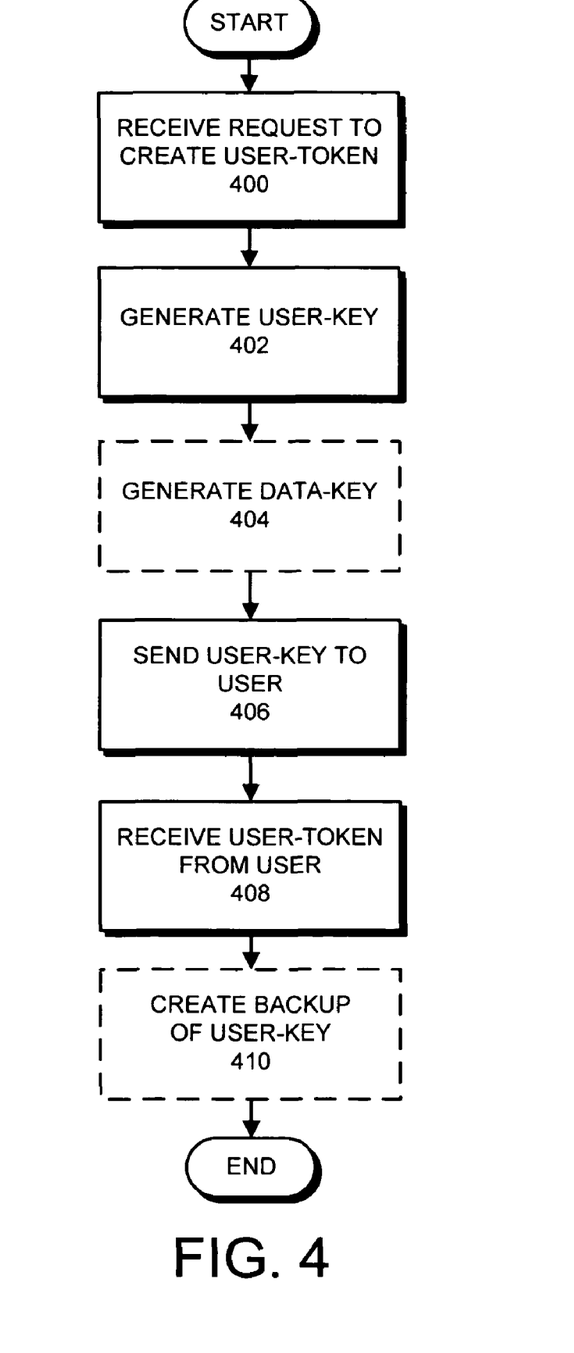
FIG. 4 presents a flowchart illustrating the process of creating a user-token in accordance with an embodiment of the present invention.

FIG. 4 presents a flowchart illustrating the process of creating a user-token in accordance with an embodiment of the present invention. The process begins when database 150 receives a request from user 112 to create a user-token (step 400). Next, database 150 generates a user-key (step 402). In one embodiment of the present invention, database 150 encrypts and decrypts data with the user-key.

In one embodiment of the present invention, user 112 generates the user-key.

In one embodiment of the present invention, database 150 generates a data-key (step 404). In this embodiment, database 150 encrypts and decrypts data with the user-key. This step is optional as illustrated by the broken lines surrounding step 404.

In one embodiment of the present invention, user 112 generates the data-key.

In one embodiment of the present invention, database 150 sends the user-key, $S_{KEY}$, to user 112 (step 406). Next, Database 150 receives the user-token from user 112 (step 408). Note that the user-token can include the user-key, $S_{KEY}$, encrypted with a user-secret, $U_{SECRET}$. Note that the user-secret can include a cryptographic key, a password, and a certificate.

In one embodiment of the present invention, database 150 creates a backup of the user-key, $S_{KEY}$ (step 410). This step is optional as illustrated by the broken lines surrounding step 410.

Creating a Backup Copy of a User-Key

Figure 5:
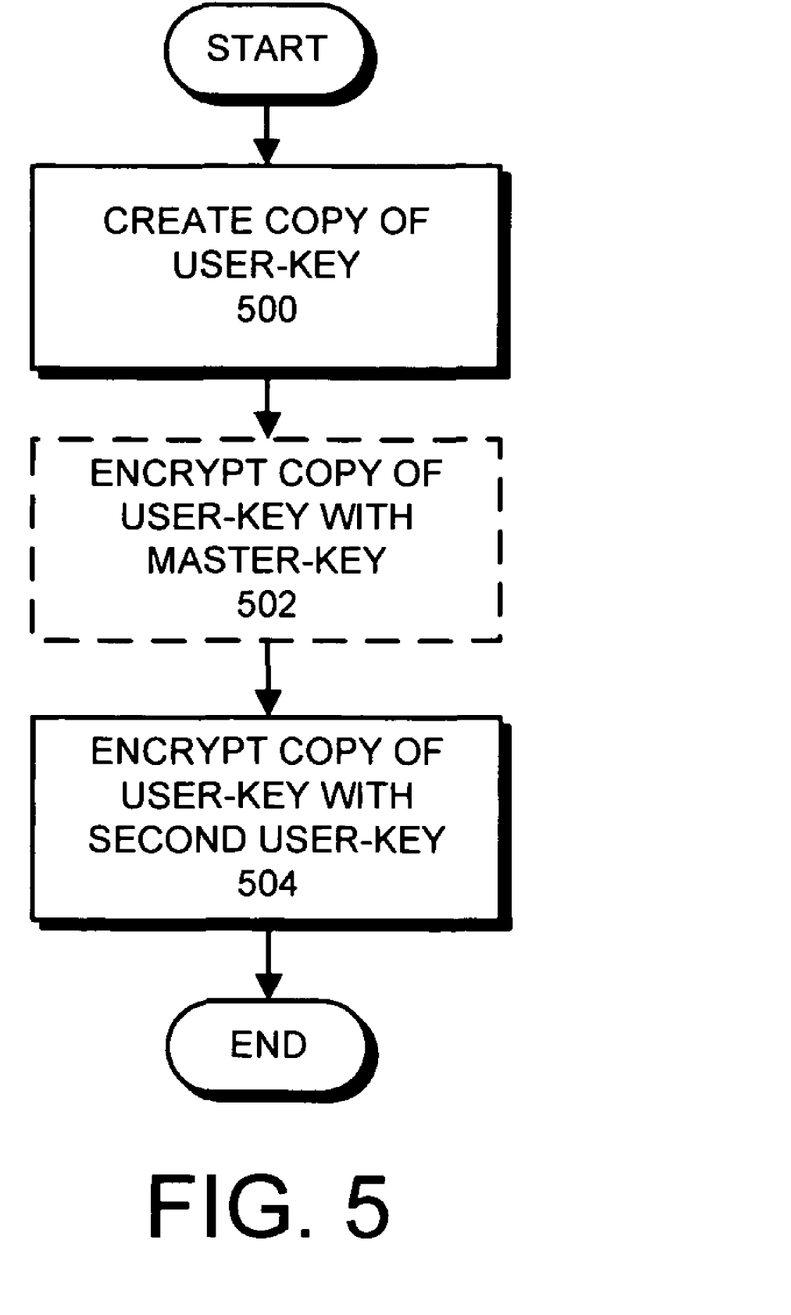
FIG. 5 presents a flowchart illustrating the process of creating a backup copy of a user-key in accordance with an embodiment of the present invention.

FIG. 5 presents a flowchart illustrating the process of creating a backup copy of a user-key in accordance with an embodiment of the present invention. The process begins when database 150 creates a copy of a user-key (step 500).

In one embodiment of the present invention, database 150 encrypts the copy of the user-key with a master-key (step 502). This step is optional as illustrated by the broken lines surrounding step 502.

In one embodiment of the present invention, database 150 stores the master-key in external security module 170, which is coupled to database 150.

Next, database 150 encrypts the copy of the user-key, $S_{KEY}$, with a second user-key (step 504). Note that the second user-key does not belong to the same user as the user-key.

In one embodiment of the present invention, the second user-key belongs to the same user as the user-key.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing keys, comprising:
   receiving a request at a database system from a user to encrypt/decrypt data at the database system;
   sending a user-token from the database system to the user, wherein the user-token includes a user-key encrypted with a user-secret thereby allowing the user to decrypt the user-key with the user-secret, and wherein the database system does not otherwise have access to the user-secret;
   receiving, at the database system, the user-key which has been decrypted by the user;
   using the user-key to encrypt/decrypt the data at the database system; and
   deleting the user-key at the database system.

2. The method of claim 1, wherein using the user-key to encrypt/decrypt the data involves directly encrypting/decrypting the data with the user-key.

3. The method of claim 1, wherein using the user-key to encrypt/decrypt the data involves:
   decrypting an encrypted data-key with the user-key to obtain a data-key; and
   using the data-key to encrypt/decrypt the data.

4. The method of claim 3, wherein a second copy of the data-key is encrypted with a second user-key belonging to a second user so that the second user can also access the data.

5. The method of claim 4, further comprising:
   modifying the data-key;
   encrypting the modified data-key with the user-key belonging to the user;
   deleting the encrypted second copy of the data-key;
   creating a new second copy of the data-key to match the modified data-key; and
   encrypting the new second copy of the data-key with the second user-key belonging to the second user.

6. The method of claim 1, wherein a second copy of the user-key is encrypted with a second user-key belonging to a second user so that the second user can also access the data.

7. The method of claim 1, wherein a second copy of the user-key is encrypted with a master key, which is stored in an external security module coupled to the database system; and wherein the encrypted second copy of the user-key is further encrypted with a second user-key belonging to a second user so that the second user can also access the data.

8. The method of claim 1, further comprising creating the user-token by:
   receiving a request from the user at the database system to create the user-token;
   generating the user-key;
   sending the user-key to the user; and
   receiving the user-token from the user, wherein the user-token includes the user-key encrypted with the user-secret.

9. The method of claim 8, wherein generating the user-key involves receiving the user-key from the user.

10. The method of claim 1, wherein the user-secret can include:
    a cryptographic key;
    a password; or
    a certificate.

11. A non-transitory computer-readable storage medium storing instructions that when executed by a computer cause the computer to perform a method for managing keys, comprising:
    receiving a request at a database system from a user to encrypt/decrypt data at the database system;
    sending a user-token from the database system to the user, wherein the user-token includes a user-key encrypted with a user-secret thereby allowing the user to decrypt the user-key with the user-secret, and wherein the database system does not otherwise have access to the user-secret;
    receiving, at the database system, the user-key which has been decrypted by the user;
    using the user-key to encrypt/decrypt the data at the database system; and
    deleting the user-key at the database system.

12. The computer-readable storage medium of claim 11, wherein using the user-key to encrypt/decrypt the data involves directly encrypting/decrypting the data with the user-key.

13. The computer-readable storage medium of claim 11, wherein using the user-key to encrypt/decrypt the data involves:
    decrypting an encrypted data-key with the user-key to obtain a data-key; and
    using the data-key to encrypt/decrypt the data.

14. The computer-readable storage medium of claim 13, wherein a second copy of the data-key is encrypted with a second user-key belonging to a second user so that the second user can also access the data.

15. The computer-readable storage medium of claim 14, further comprising:
    modifying the data-key;
    encrypting the modified data-key with the user-key belonging to the user
    deleting the encrypted second copy of the data-key;
    creating a new second copy of the data-key to match the modified data-key; and
    encrypting the new second copy of the data-key with the second user-key belonging to the second user.

16. The computer-readable storage medium of claim 11, wherein a second copy of the user-key is encrypted with a second user-key belonging to a second user so that the second user can also access the data.

17. The computer-readable storage medium of claim 11, wherein a second copy of the user-key is encrypted with a master key, which is stored in an external security module coupled to the database; and wherein the encrypted second copy of the user-key is further encrypted with a second user-key belonging to a second user so that the second user can also access the data.

18. The computer-readable storage medium of claim 11, further comprising creating the user-token by:
- receiving a request from the user at the database system to create the user-token;
- generating the user-key;
- sending the user-key to the user; and
- receiving the user-token from the user, wherein the user-token includes the user-key encrypted with the user-secret.

19. The computer-readable storage medium of claim 18, wherein generating the user-key involves receiving the user-key from the user.

20. The computer-readable storage medium of claim 11, wherein the user-secret can include:
- a cryptographic key;
- a password; or
- a certificate.

21. An apparatus that manages keys, comprising:
- a database system;
- a receiving mechanism configured to receive a request at the database system from a user to encrypt/decrypt data at the database system;
- a sending mechanism configured to send a user-token from the database system to the user, wherein the user-token includes a user-key encrypted with a user-secret thereby allowing the user to decrypt the user-key with the user-secret, and wherein the database system does not otherwise have access to the user-secret;
- the receiving mechanism further configured to receive the user-key which has been decrypted by the user at the database system;
- an encryption/decryption mechanism configured to use the user-key to encrypt/decrypt the data at the database system; and
- a deleting mechanism configured to delete the user-key at the database system.

22. The apparatus of claim 21, wherein while using the user-key to encrypt/decrypt the data, the encryption/decryption mechanism is configured to:
- decrypt an encrypted data-key with the user-key to obtain a data-key; and to
- use the data-key to encrypt/decrypt the data.

23. The apparatus of claim 22, further comprising an encrypting mechanism configured to encrypt a second copy of the data-key with a second user-key belonging to a second user so that the second user can also access the data.

* * * * *